UNITED STATES PATENT OFFICE.

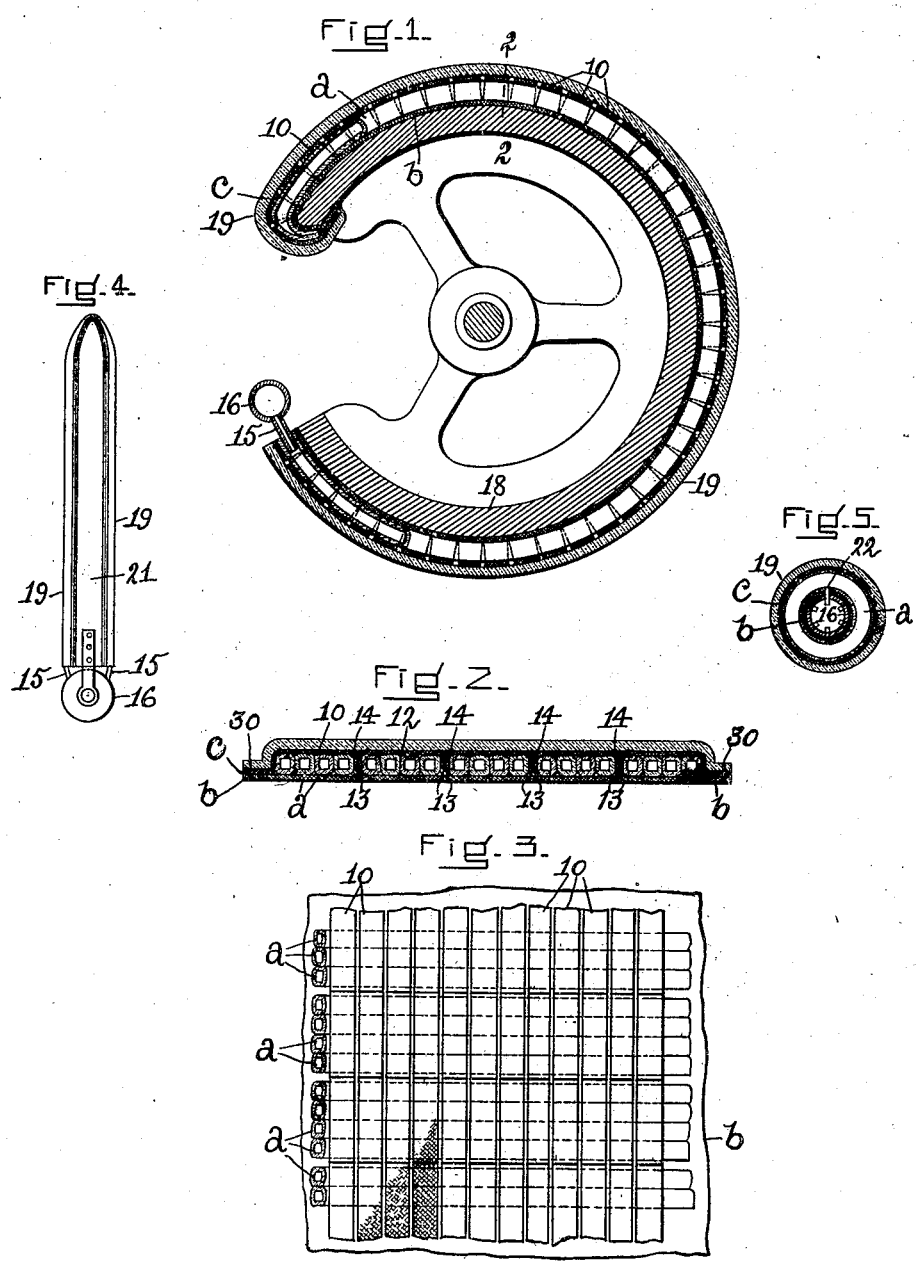

HENRY A. HOLDER, OF LYNN, MASSACHUSETTS, ASSIGNOR TO HOLDER-PERKINS COMPANY, OF WOBURN, MASSACHUSETTS, A CORPORATION OF MASSACHUSETTS.

PNEUMATIC BED FOR HIDE AND LEATHER WORKING MACHINES.

1,211,846.   Specification of Letters Patent.   Patented Jan. 9, 1917.

Application filed April 29, 1914. Serial No. 835,323.

*To all whom it may concern:*

Be it known that I, HENRY A. HOLDER, a citizen of the United States, residing in Lynn, in the county of Essex and State of Massachusetts, have invented an Improvement in Pneumatic Beds for Hide and Leather Working Machines, of which the following description, in connection with the accompanying drawings, is a specification, like characters on the drawings representing like parts.

This invention relates to an elastic fluid support or bed, which is especially designed and adapted for use in machines for treating hides, skins and leather.

The invention has for its object to provide a novel pneumatic or other elastic fluid bed or work support, which is capable of being embodied in various forms, so that it may be used in machines designed to perform various or different operations on the hide, skin or leather.

The pneumatic bed may be made circular in form and used in a machine in which the work support is in the form of a roll, or a continuous or segmental drum, and used for fleshing, unhairing and the like, or it may be made flat or substantially flat and used on a table in putting out or like machines.

To this end, a pneumatic member, preferably composed of a plurality of rubber or like elastic and compressible and extensible tubes, is confined against outward displacement under the influence of excessive internal fluid pressure by an outer member of canvas or other substantially non-stretchable material, which is secured at its sides in fixed relation, so as to resist internal pressure.

The outer non-stretchable fibrous member may and preferably will be stitched or otherwise secured to an inner non-stretchable member of canvas or like material, so that the pneumatic member may be confined between two non-stretchable members, and the inner non-stretchable member may be fastened to a rigid backing member. The outer non-stretchable member may and preferably will be covered with a yielding member of rubber or like material, which may be vulcanized to the outer non-stretchable member and is preferably of substantial thickness, so as to form the wearing surface of the bed or work support.

Provision is made for supplying the pneumatic member with air under pressure and for storage of a volume of air in excess of that necessary to fill the pneumatic member with the normal pressure, and to this end a storage chamber or reservoir is provided, which is movable with the bed or work support and communicates with the pneumatic member.

These and other features of this invention will be pointed out in the claims at the end of this specification.

Figure 1 is a section of one form of pneumatic work support embodying this invention. Fig. 2, a section on the line 2—2. Fig. 3, a developed view of a portion of the work support shown in Fig. 1, and Figs. 4 and 5, modifications to be referred to.

In the embodiment of the invention herein shown, the pneumatic member consists of a plurality or series of tubes $a$ of rubber or like elastic material, which are arranged in parallel relation and are interposed between two layers or members $b$, $c$, of substantially non-stretchable material such as canvas, which are secured together in fixed relation.

These canvas members may be designated as the inner and outer members, and the inner member $b$ may be made as a single sheet or layer, and the outer member $c$ may be made as a plurality of substantially narrow strips 10, which have a substantially parallel arrangement with relation to one another and which may be laid close together or as herein shown, may be slightly separated from one another. Each strip 10 may and preferably will be riveted, stitched or otherwise fastened to the inner member at suitable intervals in the length of said strip, to form a plurality of pockets 12, in each of which is confined a limited number of the rubber tubes $a$.

As represented in Fig. 2, the strips 10 are secured to the canvas layer $b$ by stitches 13 to form five pockets, in each of which four tubes $a$ are confined, and the adjacent side walls of adjoining pockets may and preferably will be secured together at their upper ends by stitches 14 or otherwise. The inner and outer members $b$, $c$, are thus fastened together in fixed relation at opposite sides and at intermediate points, and in the present instance said members may be fastened together at one end to close the pockets at that end, and be left separate at their other end to leave the pockets open for access to the tubes within the pockets, for the connection of the said tubes, by nipples 15 with a closed pipe, tube or reservoir 16, designed to contain air or other fluid under pressure, and constituting a reservoir with which the individual rubber tubes $a$ communicate. The pneumatic bed thus formed, may be affixed to a rigid support, which is shown in the present instance as a segmental drum 18, and the outer canvas member $c$ may be covered by a bolster 19 of rubber, which may have its sides and upper end lapped under the upper end and sides of the drum and vulcanized or otherwise secured thereto. The rubber bolster 19 constitutes a yielding wearing surface for the pneumatic bed.

The pneumatic bed is herein shown in. Fig. 1 as applied to a segmental drum, and when used with this form of backing or rigid support, the rubber tubes $a$ are molded upon formers having the same curvature as the segmental drum, so that, when the pneumatic bed is applied to the drum, the rubber tubes remain of a uniform diameter throughout their length, and thereby insure the hide or skin being supported by a uniform amount of air throughout the length of the tubes.

It is not desired to limit the invention to a pneumatic bed applied to a segmental curved surface as herein shown, as it may be applied to other forms of backing members, as for instance to a substantially flat support or table 21, which is conventionally represented in Fig. 4 and is the same as that now used in putting out machines, or to a cylinder or roll as represented in section in Fig. 5, in which latter case, the reservoir 16 is located within the air tubes $a$ and constitutes the supporting or backing member therefor, and communicates with the individual rubber tubes $a$ by nipples 22, which may be attached to the rubber tubes $a$ and passed through holes in the reservoir 16. A fluid-tight joint around the nipples 22 may be effected in any suitable manner. The construction shown in Fig. 5, is suitable for use as a bed roll or when of larger diameter as a continuous drum.

In operation with the pneumatic bed herein shown, the pressure within the tubes is adjusted, so that when a thin portion of the hide, skin or leather is being subjected to the action of the operating tool, such for instance as a bladed cylinder, not shown, but such as is now commonly employed in hide and leather working machines, the outer surface of the work support or bed will remain smooth or in its normal condition. When, however, a thicker portion of the hide, skin or leather is being acted upon by the operating tool, the portion of the pneumatic bed under the thicker portion will be depressed or forced inwardly, thereby creating an additional air pressure within the air tubes, which is rendered harmless to bulge out the other portions of the bed by the non-stretchable member $c$, which resists this extra internal pressure and prevents the uncovered portions of the bed being bulged or forced outwardly so as to be cut or otherwise injured by the operating tool. The non-stretchable member $c$ thus acts as a resisting member against a normal internal pressure, and against an increased internal pressure which is created by an abnormal external pressure, and is assisted by the reservoir and those tubes which are not subjected to the abnormal external pressure, inasmuch as the extra external pressure which is local and may be excessive at a given part of the bed, is distributed or diffused over a materially larger area, and is thereby more or less absorbed and reduced to such extent, as to be harmless to distort or bulge out or otherwise displace, that portion of the surface of the bed which is not subjected to the excessive external pressure. As a result of the coöperation of the resisting member $c$ and of the reservoir 16, the member $c$ may be made of minimum strength and thickness, so as not to impair or sacrifice the benefits which inhere in the use of the air for supporting the work.

The outer member $c$ is made of strips, which are separated, so that the length of canvas circumferentially of the drum in the outer member $c$, is the same as that of the inner member $b$, notwithstanding the fact that the outer member $c$ is in a circle of larger diameter than the inner member $b$, and these strips are preferably made narrow, so as to avoid plaiting or puckering of the member $c$ under the influence of the working tool as the drum revolves, and also to avoid injurious strain upon the outer canvas member $c$. The portions of the outer strips $c$, which are stitched or otherwise secured to the inner layer or member $b$, are brought substantially close together and preferably in contact with like portions of adjacent strips, whereas those portions of the strips which form the outer walls of the pockets and which are in a circle of larger diameter than the inner member $b$, are slightly separated from the like walls of adjacent pockets, as represented in Figs. 1 and 3.

By the term pneumatic member as used in the claims, it is intended to include other elastic fluids in addition to air, but the latter is preferred.

The non-stretchable member $c$ is fastened to the member $b$ at its opposite sides by stitches 30 or otherwise, and the depth of the pockets 12 is such that when the tubes $a$ are filled with air, the said tubes are caused to fill the pockets and assume a substantially flat condition in contact with the outer walls of the pockets, and thus form a substantially continuous pneumatic support transversely of the bed.

Claims:

1. In a work support of the character described, a pneumatic member containing air under pressure, a supporting member for said pneumatic member, a member of substantially non-stretchable material covering the pneumatic member and secured in fixed relation to said supporting member at its sides and at a plurality of points between its sides to form a plurality of pockets within which the pneumatic member is confined, substantially as described.

2. In a work support of the character described, a plurality of hollow yielding members, a reservoir with which said members communicate, a member of substantially non-stretchable material covering the said yielding members and secured in fixed relation at its sides and between its sides to form a plurality of pockets in which said hollow yielding members are confined.

3. In a work support of the character described, a member of substantially non-stretchable material, a second member of substantially non-stretchable material composed of a plurality of strips which are secured to the first mentioned member in fixed relation at their sides and between said sides to form a plurality of pockets, a plurality of hollow yielding members located in said pockets, and a reservoir for containing elastic fluid with which said hollow yielding members communicate.

4. In a work support of the character described, a plurality of hollow yielding members, a reservoir with which said members communicate, a member of substantially non-stretchable material covering the said yielding members and secured in fixed relation at its sides and between its sides to form a plurality of pockets in which said hollow yielding members are confined, and means for securing together the adjacent walls of adjoining pockets near the outer walls of the latter.

5. In a work support of the character described, a member of substantially non-stretchable material, means for forming said member into a plurality of pockets, hollow yielding members located in said pockets, and means to secure together the side walls of said pockets near the outer walls of the same.

6. In a work support of the character described, a pneumatic member, a supporting member for said pneumatic member, and a member of substantially non-stretchable material covering said pneumatic member and composed of a plurality of substantially narrow strips of fibrous material secured in fixed relation to said supporting member.

In testimony whereof, I have signed my name to this specification in the presence of two subscribing witnesses.

HENRY A. HOLDER.

Witnesses:
 JAS. H. CHURCHILL,
 J. MURPHY.